(12) United States Patent
Sandstrom et al.

(10) Patent No.: US 9,776,456 B2
(45) Date of Patent: Oct. 3, 2017

(54) ZONED TREAD FOR RACING TIRES

(75) Inventors: Paul Harry Sandstrom, Cuyahoga Falls, OH (US); Andrew Frederick Weimer, Akron, OH (US); Richard Barkley Campbell, Massillon, OH (US); Thomas Charles Lippello, III, Akron, OH (US); Mark Alan Keto, Ravenna, OH (US); Larry Alan Kraus, Uniontown, OH (US); Steven Wayne Cronin, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 769 days.

(21) Appl. No.: 13/009,532

(22) Filed: Jan. 19, 2011

(65) Prior Publication Data

US 2012/0180918 A1    Jul. 19, 2012

(51) Int. Cl.
*B60C 1/00* (2006.01)
*B60C 11/00* (2006.01)

(52) U.S. Cl.
CPC ........ *B60C 11/0058* (2013.01); *B60C 1/0016* (2013.01); *B60C 11/0066* (2013.01); *B60C 2011/0025* (2013.01); *B60C 2011/0033* (2013.01)

(58) Field of Classification Search
CPC . B60C 11/00; B60C 11/0041; B60C 11/0058; B60C 1/0016
See application file for complete search history.

(56) References Cited

U.S. PATENT DOCUMENTS

| 3,231,000 A | 1/1966 | Massoubre |
| 3,286,756 A | 11/1966 | Ellenrieder et al. |
| 4,794,965 A * | 1/1989 | Lagnier .............. 152/209.24 |

(Continued)

FOREIGN PATENT DOCUMENTS

| CA | 1095822 | 2/1981 |
| EP | 0864446 A1 | 9/1998 |

(Continued)

OTHER PUBLICATIONS

Machine translation of JP 2003-326917, 2003.*
Race Tire vs. Street Tire; www.racegoodyear.com/innovation/track_street.html.

*Primary Examiner* — Justin Fischer
(74) *Attorney, Agent, or Firm* — Wood Herron & Evans LLP

(57) ABSTRACT

A racing tire comprising a tread having a new tread thickness of no greater than about 0.375 inch. The tread defines a running surface that includes a first circumferential portion of a first rubber compound and a second circumferential portion of a second rubber compound situated adjacent one another. The first rubber compound has a greater stiffness than the second rubber compound so as to provide the tread with greater wear resistance along the first circumferential portion, and the second rubber compound provides the tread with greater traction along the second circumferential portion. The tread may be substantially free of a tread pattern. The second rubber compound may have a greater DIN abrasion value than the first rubber compound. The second rubber compound may have a higher tan delta at 100° C. and/or a higher J" traction value than the first rubber compound.

5 Claims, 3 Drawing Sheets

(56) References Cited

U.S. PATENT DOCUMENTS

| | | | |
|---|---|---|---|
| 4,848,429 A | 7/1989 | Mezzanotte | |
| 5,225,011 A | 7/1993 | Takino et al. | |
| 5,529,101 A | 6/1996 | Croyle et al. | |
| 5,620,538 A | 4/1997 | Oshima | |
| 5,639,817 A * | 6/1997 | Probst et al. | 524/496 |
| 5,829,503 A * | 11/1998 | Watkins et al. | 152/209.5 |
| 5,905,112 A * | 5/1999 | Hellermann | 524/575 |
| 6,035,911 A * | 3/2000 | Matsumoto et al. | 152/209.5 |
| 6,378,582 B1 * | 4/2002 | Sandstrom et al. | 152/209.1 |
| 6,405,775 B1 * | 6/2002 | Maly et al. | 152/564 |
| 6,719,025 B2 | 4/2004 | Caretta et al. | |
| 6,758,928 B2 | 7/2004 | Hubbell, Jr. et al. | |
| 6,959,744 B2 | 11/2005 | Sandstrom et al. | |
| 7,040,870 B2 | 5/2006 | Nicolas et al. | |
| 7,131,474 B2 | 11/2006 | Sandstrom | |
| 7,140,410 B2 * | 11/2006 | Helt et al. | 152/154.2 |
| 7,481,638 B1 | 1/2009 | Burg | |
| 7,780,809 B2 | 8/2010 | Koch et al. | |
| 8,011,404 B2 * | 9/2011 | Ishiyama et al. | 152/526 |
| 8,071,668 B2 * | 12/2011 | Campomizzi et al. | 524/414 |
| 8,297,324 B2 * | 10/2012 | Terada | 152/209.5 |
| 8,464,769 B2 * | 6/2013 | Yoshinaka et al. | 152/209.5 |
| 2002/0069948 A1 | 6/2002 | Sentmanat | |
| 2003/0155057 A1 | 8/2003 | Hubbell, Jr. et al. | |
| 2008/0105353 A1 * | 5/2008 | Losi | B29D 30/60 152/537 |
| 2010/0212799 A1 * | 8/2010 | Kasai | 152/454 |

FOREIGN PATENT DOCUMENTS

| | | | |
|---|---|---|---|
| EP | 2067637 | * | 6/2009 |
| JP | 60-135309 | * | 7/1985 |
| JP | 03125604 | * | 5/1991 |
| JP | 2003-326917 | * | 11/2003 |
| JP | 2005-199922 | * | 7/2005 |
| JP | 2009-51425 | * | 3/2009 |
| WO | WO 2009/072328 | * | 6/2009 |

* cited by examiner

ZONED TREAD FOR RACING TIRES

TECHNICAL FIELD

The present invention generally concerns racing tires for use on race cars.

BACKGROUND

In stock car racing, a race car will typically race on an oval track measuring approximately ¼ mile to 2.66 miles in length. Oval tracks are classified as short track (less than 1 mile), intermediate or speedway (1 to 2 miles), or superspeedway (over 2 miles) and have 3 or 4 turns—all to the left. Top level races are 200 to 600 miles long, during which a race car may reach speeds in excess of 200 mph.

The National Association for Stock Car Auto Racing (NASCAR) is the largest sanctioning body of stock car racing in the United States and sanctions the races of the Sprint Cup Series, the Nationwide Series, and the Camping World Truck Series, to name a few. Of the various technical requirements imposed by NASCAR on the race cars or race trucks (collectively referred to as "race cars"), all race cars in the top three series must use racing tires manufactured by Goodyear Tire and Rubber Company. Due to the performance and safety requirements, racing tires are technological marvels compared to the more ubiquitous passenger tires or even so-called high performance, though less-common, street-racing tires. Racing tires for use in NASCAR sanctioned races must maintain structural integrity at high rotation rates and under adverse loading conditions, such as in high-speed left turns. Such loading conditions are generally not experienced by passenger tires or even by high performance street tires.

The driving conditions experienced by tires used on race cars are significantly different from day-to-day driving experienced by passenger-car tires. For one, the race cars are significantly different from passenger cars. While race cars for racing in NASCAR sanctioned races are roughly equivalent in weight to a passenger car, race cars may reach speeds in excess of 200 mph due to their 900+ horsepower engines. By comparison, most passenger car engines have less than one-half of the horsepower, at most, and do not ordinarily accelerate at the rate that a race car does or reach speeds of even 100 mph over any prolonged period.

Furthermore, the race track is different from a day-to-day road on which a passenger car rides. The loading on the tire due to the shape of the race track is a repetitive, asymmetrical-type loading. For example, most of the Sprint Cup races are on oval tracks, where the race cars travel in a counterclockwise direction such that the turns are all to the left. Passenger car tires, on the other hand, experience a more equal, all-around loading owing to the nearly equivalent number of left and right hand turns.

Another difference between day-to-day driving and organized racing is the condition of the road surface. For safety, NASCAR races are only held on dry, paved tracks. By comparison, normal road surfaces may be gravel, dirt, asphalt, or concrete and may be dry, wet, snowy, or icy or a combination of these conditions. Thus passenger tires must have good handling characteristics when operated in a variety of road surface conditions, not just under ideal road conditions. Because of the disparity in required performance under the above-mentioned conditions, technology used in passenger or similar tires is generally not transferable to racing tires.

Of the conditions experienced by racing tires, particularly those developed for use in NASCAR sanctioned racing, the continuous left-hand turns in combination with other factors (e.g., high speeds) are possibly the most detrimental condition to the tire's performance. While the turns are banked from 6 to 36 degrees, the repetitive directional loading on the tires causes them to wear unevenly. The type and severity of the uneven wear varies by position on the race car. For instance, the right front tire is the most highly loaded while the remaining tires are loaded to a lesser degree than the right front tire. Accordingly, the performance requirements for each tire position on the car are dissimilar. While various strategies have been proposed and used to counter this problem, none of these strategies have been fully effective.

Therefore, there is a need for an improved tire that can endure the racing conditions on a paved, oval race track, while having good traction and wear resistance and while maximizing the relatively short usable life of the race tire.

SUMMARY

The present invention is directed to a racing tire. In one embodiment, the racing tire includes a tread having a new tread thickness of no greater than about 0.375 inch. The tread defines a running surface that includes a first circumferential portion of a first rubber compound and a second circumferential portion of a second rubber compound. The first circumferential portion is situated adjacent the second circumferential portion. The first rubber compound has a greater stiffness than the second rubber compound so as to provide the tread with greater wear resistance along the first circumferential portion, and the second rubber compound provides the tread with greater traction along the second circumferential portion. In one example, the tread is substantially free of a tread pattern. In another example, the second rubber compound has a greater DIN abrasion value than the first rubber compound. In yet another example, the second rubber compound has a higher tan delta at 100° C. and/or a higher J" traction value than the first rubber compound.

BRIEF DESCRIPTION OF THE DRAWINGS

The invention will be described by way of example and with reference to the accompanying drawings in which.

DETAILED DESCRIPTION

Figure 1:
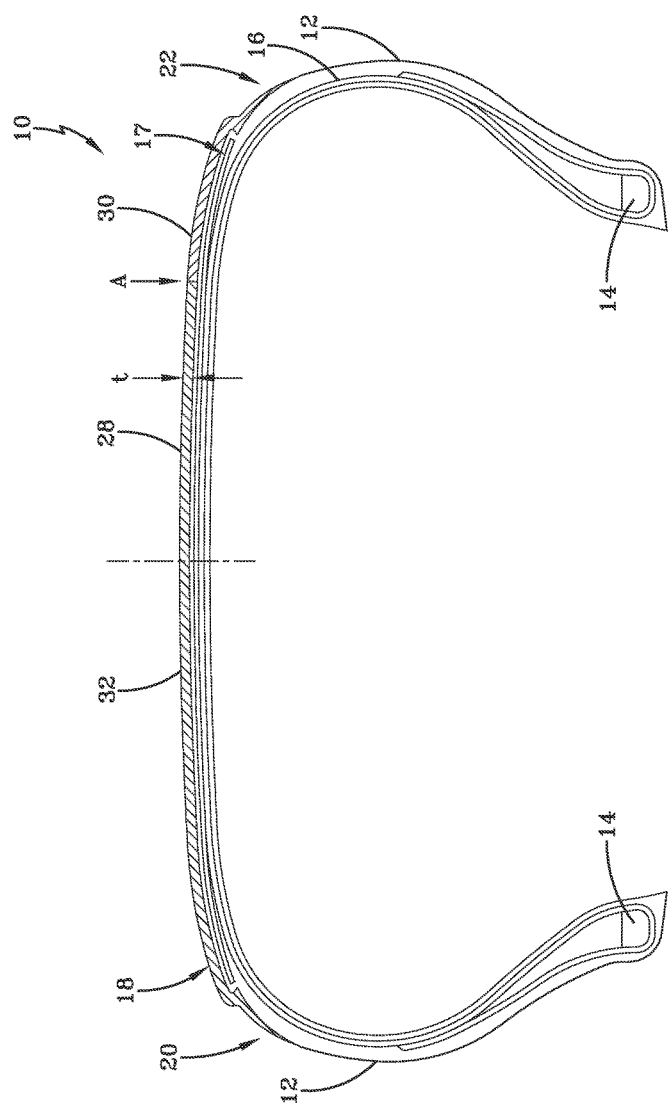
FIG. 1 is a cross-sectional view of a racing tire according to an embodiment of the invention depicting a tread having two annular zones of different compositions.

With reference to FIG. 1, there is shown a racing tire 10 that includes sidewalls 12, inextensible beads 14, a supporting carcass 16, belt 17, and a tread 18. The individual sidewalls 12 extend radially inward from the axial outer edges of the tread 18 to join the respective inextensible beads 14. Opposing shoulders 20 and 22 of the sidewalls 12 define the width of the tread 18 and specifically join the respective sidewall 12 with the tread 18. The racing tire 10 does not include an undertread or tread base beneath the tread 18. The supporting carcass 16 acts as a supporting structure for the tread 18 and the sidewalls 12. The tread 18 includes a running surface 28 that is adapted to be ground contacting when the tire 10 is in use, and is configured to provide the racing tire 10 with traction sufficient to allow the race car to negotiate a racetrack at high speeds. Generally, this entails preventing substantial, uncontrolled sliding of the tread 18 across the race track while the race car accelerates and/or decelerates through corners and along the straightaways. In one example, the racing tire 10 is meant specifically for races sanctioned by NASCAR, such as, the races that are a part of the Sprint Cup Series, the Nationwide Series, and/or the Camping World Truck Series.

Figure 2:
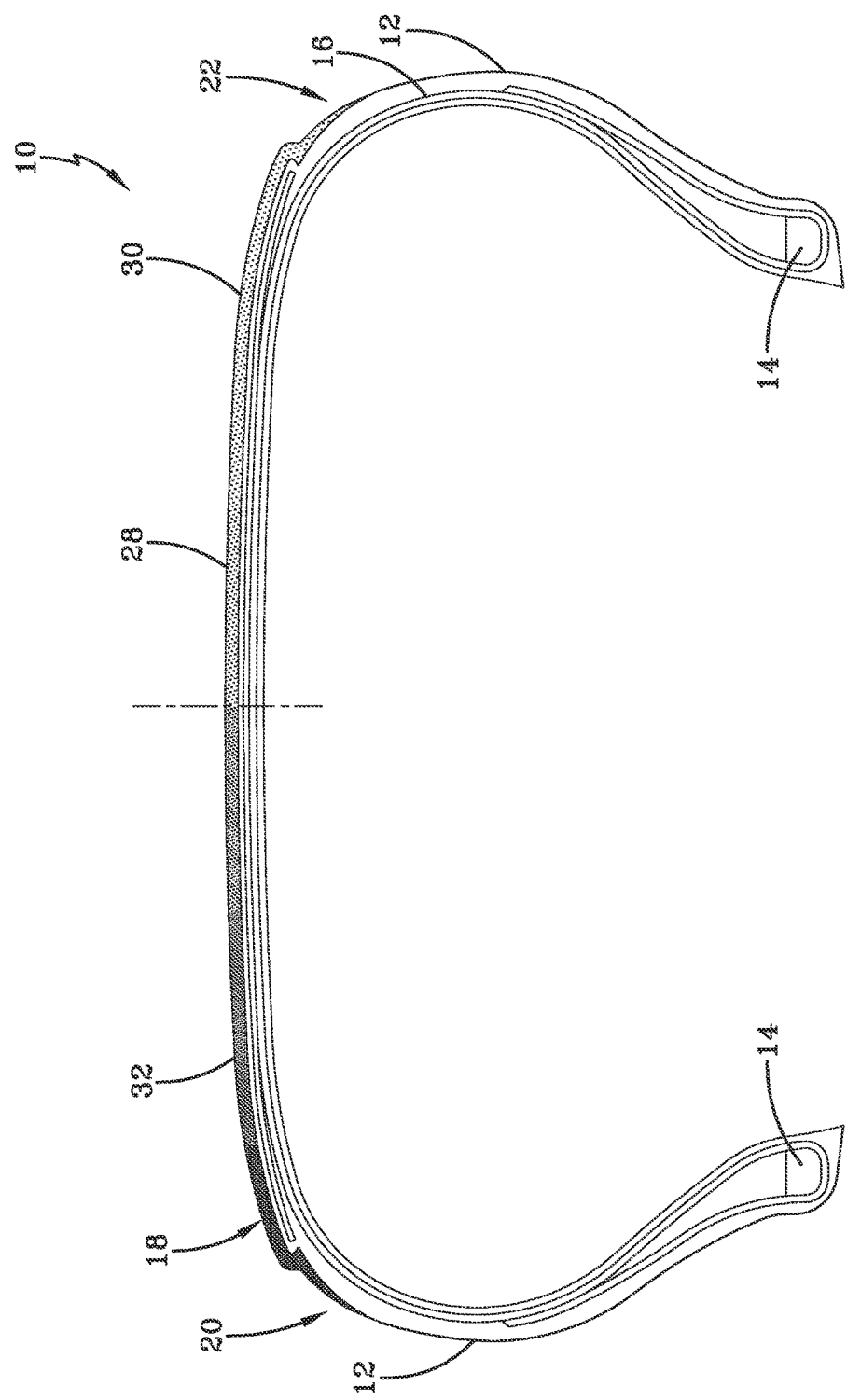
FIG. 2 is a cross-sectional view of a racing tire according to another embodiment of the present invention depicting a gradient distribution in the composition of the tread.
Figure 3:
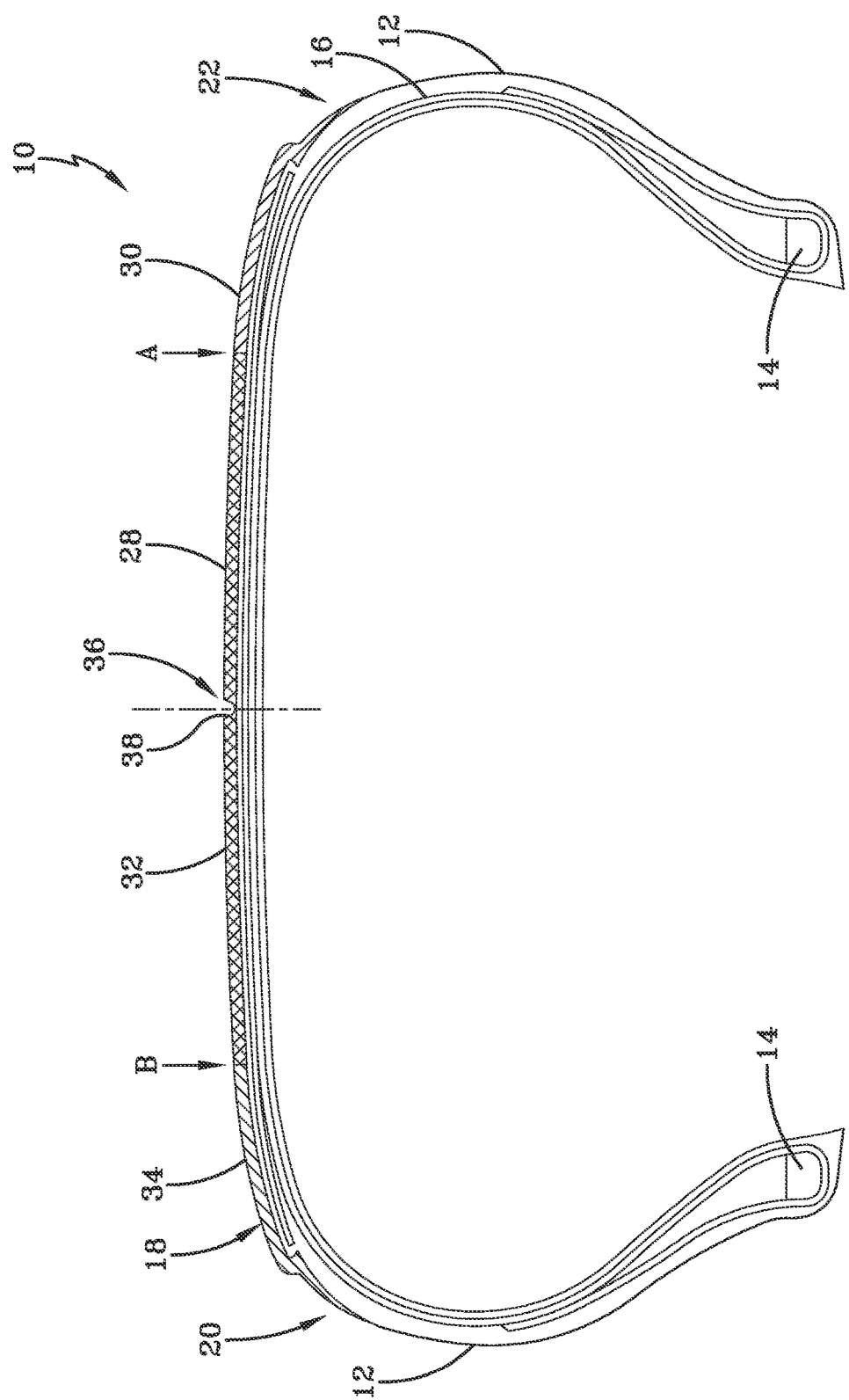
FIG. 3 is a cross-sectional view of a racing tire according to another embodiment of the present invention depicting a tread having three annular zones of different compositions.

To this end, and with reference to FIGS. 1-3, the running surface 28 can generally include two or more annular circumferential portions 30 and 32 (FIGS. 1 and 2) and 30, 32, and 34 (FIG. 3 only) arranged side-by-side with respect to one another. Each of the circumferential portions 30, 32, 34 defines a portion of the running surface 28. At least two of the circumferential portions 30, 32, 34 differ in composition and properties from each other. That is, the tread 18 is not a single homogenous rubber compound. So, rather than a homogenous compound forming the running surface 28, which would amount to a compromise between traction and wear resistance, the first and second rubber compounds may provide the running surface 28 with a higher level of both traction and wear resistance than a comparative running surface of the homogenous compound.

In one embodiment and specifically with reference to FIG. 1, the running surface 28 may include first circumferential portion 30 of a first rubber compound and second circumferential portion 32 of a second rubber compound. While the properties of the respective compounds are described in more detail below, the first rubber compound has a greater stiffness than the second rubber compound. In other words, the first rubber compound has a greater modulus of elasticity than the modulus of elasticity of the second rubber compound. In addition, the second rubber compound has a greater traction than the first rubber compound. As shown, the first circumferential portion 30 is situated adjacent the second circumferential portion 32. Although not limited to the positions shown, the first circumferential portion 30 extends from the shoulder 22 toward the opposing shoulder 20 and meets the second circumferential portion 32 at an interface "A" between the shoulders 20, 22. The second circumferential portion 32 extends from the shoulder 20 to the interface A, is greater in width than the first circumferential portion 30, and forms at least a central portion of the tread 18. It will be appreciated that the orientation of the first circumferential portion 30 in relation to the second circumferential portion 32 may be reversed from that shown in FIG. 1 with the orientation depending on the specific tire position onto which the tire 10 is installed on the race car (i.e., front left tire, front right tire, rear left tire, or rear right tire).

With reference now to FIG. 2, in another embodiment, the rubber compounds may not change abruptly across an interface, such as, at the interface A as shown in FIG. 1. Rather, the tread 18 of FIG. 2 is formed by a gradual transition from the first rubber compound of the first circumferential portion 30 to the second rubber compound of the second circumferential portion 32. By way of example, the first circumferential portion 30 may extend from the shoulder 22 and gradually transition to the second rubber compound of the second circumferential portion 32 at the shoulder 20. The gradient in compounds may be symmetrical around the midpoint of the running surface 28, with the properties of the gradient being a similar gradient in traction and wear properties from that of the first rubber compound to that of the second rubber compound. Embodiments of the present invention are not, however, limited to gradients in rubber compounds that are symmetrical.

Referring again to FIG. 1, the first and second circumferential portions 30, 32 may define the entire width of the running surface 28 of the tread 18, as shown. However, as is shown in FIG. 3, in another embodiment, the combined individual widths of first and second portions 30, 32 may define less than the entire running surface 28 and, in fact, do not extend the full width of the tread 18. And, in addition to the first and second circumferential portions 30, 32, a third circumferential portion 34 extends from the shoulder 20 to an interface B with the second circumferential portion 32. The first and second circumferential portions 30, 32 may occupy from about 10% to about 95%, and by way of further example, from about 30% to about 75% of the running surface 28. The respective widths of the portions 30, 32 may depend upon the corresponding compounds and the equipment available for manufacturing the tread 18, among other factors. Furthermore, the circumferential portions 30, 32, and/or 34 may have the same widths or different relative widths.

The third circumferential portion 34 may be made of the same material as the first circumferential portion or of a different material. In one embodiment, the third circumferential portion 34 may be of a third rubber compound that has improved traction versus the second or first rubber compounds. In this instance, the side-by-side arrangement of the first, second, and third rubber compounds may constructively form a gradient in the traction and/or the wear resistance of the running surface 28, from the first to the third rubber compound. For example, the gradient in the traction property may be the lowest in the first rubber compound with the second rubber compound having a higher traction than the first rubber compound and the third rubber compound having a higher traction than the second rubber compound. The wear resistance of the rubber compounds may decrease in the same order. For example, the first rubber compound may have the highest wear resistance of the three rubber compounds with the third rubber compound having the lowest wear resistance. As introduced above, additional circumferential portions may be utilized, for example, to produce a more well-defined gradient or an overall greater contrast in properties of the running surface 28 from one shoulder 20 to the other shoulder 22 or along a portion thereof.

With reference again to FIG. 1, the difference in widths of the circumferential portions 30, 32 may be related to the nature of the rubber compounds of which the circumferential portions 30, 32 are made and the desired performance characteristics of the racing tire 10. For example, when it is desired that the racing tire 10 have a proportionally greater traction than wear resistance, the second circumferential portion 32 may be enlarged relative to the first circumferential portion 30. By way of example, the ratio of widths of the first circumferential portion to the second circumferential portion may be from about 1 to 10 to about 10 to 1, and by way of further example, the ratio may be from about 1 to 4 to about 4 to 1. It will be appreciated that the proportion of the running surface 28 defined by the portions 30, 32 and the ratio of the widths of the first to the second circumferential portions may be predetermined to address specific conditions of the track, such as, the degree to which the turns are banked, the length of the track, and the surface composition of the track. Other factors that may be considered in determining the absolute and relative widths of the first and second circumferential portions include the characteristics of the race car, for example, the weight of the race cars, the setup of the race car, the driver, and the location on the race car onto which the racing tire is installed.

With further reference to FIG. 3, the tread 18 can generally include a tread pattern 36 consisting of a symmetrical circumferential groove 38. Although not limited to the location shown, the groove 38 may reside in the central region of the running surface 28. However, it is preferable that the tread 18 be substantially free of a tread pattern, as shown in FIG. 1. The tread 18, therefore, typically excludes a matrix or tread pattern and, thus, may lack any intentional grooves or valleys in the running surface 28. Such treads generally are referred to as "slicks" because of their smooth appearance. Because of minimal or no tread pattern, the race tire 10 is generally configured to be used only under closely monitored environmental conditions. For example, slicks are generally not permitted to be used in races when the race track is wet, either during or following rain. This requirement is for the safety of all persons involved. While there are other reasons, for this reason alone, the racing tire 10 is not configured to be used during normal day-to-day driving due to the lack of control of the road conditions.

With reference to FIGS. 1-3 and with regard to the thickness, T, of the tread 18, the thickness of the tread 18 is generally uniform. However, embodiments of the invention are not so limited, as the circumferential portions 30, 32, 34 may be of different thicknesses. The initial thickness of the tread 18 may be measured as the distance from the running surface 28 to the inner surface of the tread 18, when the tread 18 is new, and will decrease with tread wear. Again, the individual thicknesses of the circumferential portions 30, 32 can vary. The thickness T of the tread 18 may be that which is sufficient for the tire 10 to last only a single race or multiple races. A single race may be from about 100 miles to around 500 miles in total length. However, the tread 18 may be configured to last only the duration of a portion of a race, for example, the duration between pit stops to refuel the race car. Generally the thickness T of the tread 18, when new, is much thinner than a new passenger-car tire. In one embodiment, the thickness T of the tread 18, when new, may be no greater than about 0.375 inch. And, in another example, the thickness T may be less than 0.375 inch. In yet another example, the thickness T may be no greater than about 0.125 inch. Due to the minimal tread thicknesses of the racing tire 10, in one embodiment, the racing tire 10 may include an inner liner, e.g., the Goodyear Lifeguard Inner Liner Safety Spare, which allows the race car to return to the pits in the event of a flat.

With regard to the width of the tread 18, in one embodiment, the width of the tread 18 is greater than a normal passenger tire. The width of the tread 18 may be more than 9 inches. By way of further example, the width of the tread 18 may be greater than 11 inches.

As introduced above, the location on the racing car onto which the racing tire 10 is installed (i.e., the front left tire, front right tire, rear left tire, or rear right tire) may predetermine any one or more of the rubber compounds of the circumferential portions, their relative and absolute widths, and thicknesses. In one embodiment, the racing tire 10 is configured specifically for use on the right-front position of the racing car. The racing car may be setup to race on a track having all left-hand turns such that the race car travels in a counterclockwise direction. For example, the racing tire 10 may be installed on a race car configured to race at the Indianapolis Motor Speedway. Racing on a track having this configuration places the right-front tire in the most aggressive and abusive operating position on the race car. Furthermore, race tracks are known to have both left-hand and right-hand turns. Where the number of left-hand turns is greater than the number of right-turns, the right-front tire may still be placed in the most aggressive and abusive operating position on the race car. It will be appreciated that if the track has all right-hand turns, such that the race car travels in a clockwise direction, the racing tire 10 may be configured for installation on the left-front tire.

In further regard to the right-front tire position and with reference to FIG. 1, the racing tire 10 may be installed on the race car with the first circumferential portion 30 positioned at the outermost axial position of the tire 10 generally situated adjacent shoulder 22. The second circumferential portion 32 is thus nearer to the center line of the tire 10 than the first circumferential portion 30. According to the properties of the compounds listed above, the racing tire 10, when installed on the right-front position, may resist tread wear along the first circumferential portion 30. The loss of traction, if any, is compensated for by the second circumferential portion 32 insofar as the running surface 28 thereof may be less exposed to the severe abrasion associated with the outermost region of the right-front tire position. According to one embodiment, the first circumferential portion 30 may be positioned axially outward of the normal free-rolling footprint of the racing tire 10 when inflated and may thereby be positioned on the running surface 28 in the region of highest load during cornering. Similar arrangements may be utilized on the remaining tire positions, though the arrangement of the first circumferential portion 30 and the second circumferential portion 32 may be different as the running conditions of the racing tire 10 at these locations are different from that of the right-front position.

As introduced above, the first rubber compound has a greater stiffness than the second rubber compound so as to provide the tread with greater wear resistance along the first circumferential portion 30. The second rubber compound provides the tread 18 with greater traction than the first rubber compound along the second circumferential portion 32. While numerous rubber compounds may provide the relative difference in the stiffness and traction of the tread 18 in the first and second circumferential portions 30, 32, the desired properties of the first and second circumferential portions 30, 32 may be specified to provide the overall improved performance of the racing tire 10 as described above. In this regard, the properties include the abrasion resistance of the compound, which is indicative of the compound's ability to resist wear during use.

Measurement of abrasion resistance may be made by measuring a DIN abrasion value as a volume loss relative to a control sample according to ASTM D 5963 with a force of 10 Newtons being applied. In this test, the test rubber sample is moved across the surface of an abrasive sheet mounted to a revolving drum. The volume of the sample lost due to the contact with the drum is measured. A lower DIN abrasion value represents a more wear resistant compound. In one embodiment, the second rubber compound has a greater DIN abrasion value than the first rubber compound. In one embodiment, the DIN abrasion value of the first rubber compound may be in the range of about 100 to about 140. In another embodiment, the DIN abrasion value of the second rubber compound may be in the range of about 150 to about 300.

The rubber compounds for the circumferential portions 30, 32, 34 of FIGS. 1-3 may be further described in terms of their viscoelastic properties. As is known in the art, rubber and similar materials from which tires are made respond viscoelasticly to applied loads. As such, part of the energy input into the compound during deformation is dissipated as heat. The dynamic storage modulus (G') and the dynamic loss modulus (G") are measurements of the viscoelastic properties of rubber compounds and may be obtained using a Rubber Process Analyzer as RPA 2000™ from the Alpha Technologies. Such measurements are known to those of ordinary skill in the art. For example, using the RPA 2000™, a strain sweep at 100° C. at 1 Hz over a range of from 1% to 50% strain may be made. In one embodiment, G' of the first rubber compound is greater than G' of the second rubber compound at a temperature of 100° C. at 10% strain. The G' of the first rubber compound may be at least 15% greater than the G' of the second rubber compound, and, by way of further example, the G' of the first rubber compound may be at least 40% greater than the G' of the second rubber compound.

Another viscoelastic property is given by tan delta (δ), which is a ratio of dynamic loss modulus G" to dynamic storage modulus G', each measured at a temperature of 100° C. and a strain of 10%. As such, tan δ is a ratio of the viscous response to the elastic response and is considered to be a measure of hysteresis. Tan δ may be proportional to the energy loss generated under conditions of constant energy input. A lower hysteresis is typically indicative of lower energy loss and less heat generation. Generally, the more stiff the compound, the lower the hysteresis energy loss. However, while it is desirable that the first rubber compound is stiff, there needs to be some hysteresis to generate heat. Further, the heat buildup may be dissipated at a rate sufficient to avoid overheating the tread 18. According to one or more embodiments, the compounds of the circumferential portions 30, 32 balance heat buildup with heat dissipation in the tread 18. In one embodiment, the second rubber compound has a tan δ that is higher than the tan δ of the first compound. By way of example, the tan δ of the second rubber compound may be at least about 3% greater than the tan δ of the first rubber compound, and by way of further example, the tan δ of the second rubber compound may be at least about 5% greater than the tan δ of the first rubber compound. In one example, the second rubber compound has a tan δ in the range of about 0.150 to about 0.250, and the first rubber compound has a tan δ in the range of about 0.110 to about 0.145.

It is known in the art that compound modifications may have different effects on the hysteresis properties depending on the measurement cycling mode. Thus, both measurements in constant stress and constant strain cycling modes may provide a more complete indication of the hysteresis properties during a particular service, such as, during racing. Accordingly, another viscoelastic measurement, though the measurement is taken in a constant stress cycling mode, is the loss compliance J" or J" traction, which is a ratio of the viscous strain amplitude in response to the stress amplitude. The J" traction as set forth herein is the above ratio at 100° C. and 10% stress. In one embodiment, the second rubber compound has a higher J" traction value at 100° C. than the first rubber compound. By way of example, the J" traction value of the second rubber compound may be at least about 30% greater than the J" traction value of the first compound, and by way of further example, the J" traction value of the second rubber compound may be at least about 50% greater than the J" traction value of the first rubber compound. In one example, the J" traction value of the second rubber compound may be in the range of about 0.16 to about 0.40, and the first rubber compound may have a J" traction value in the range of about 0.10 to about 0.15.

In one embodiment, the first rubber compound may include about 96.25 parts Emulsion-Styrene-Butadiene-Rubber (E-SBR) containing about 100 phr of polymer and about 37.5 phr of an aromatic processing oil; about 30 parts cis-polybutadiene (cis-PBD); about 70 parts carbon black; processing aids and wax in the form of wax of about 25.1 parts; about 1.2 parts anti-degradation agents; about 1.8 parts zinc oxide; about 2 parts fatty acid; about 1.5 parts sulfur; and about 1.9 parts accelerators. The various measured properties of the first rubber compound included: (i) a J" value of about 0.11, (ii) a tan δ value of about 0.14, (iii) a G' of about 1.3 MPa, and (iv) a DIN abrasion value of about 106.

In one embodiment, the second rubber compound may comprise about 137.5 parts E-SBR containing about 100 phr of polymer and about 37.5 phr of an aromatic processing oil; about 72 parts carbon black; processing aids and wax in the form of wax of about 8 parts; about 1.5 parts anti-degradation agents; about 5 parts zinc oxide; about 2 parts fatty acid; about 8 parts traction resin; about 2 parts sulfur; and about 3 parts accelerators. The various measured properties of the second rubber compound included: (i) a J" value of about 0.18, (ii) a tan δ value of about 0.20, (iii) a G' of about 1.1 MPa, and (iv) a DIN abrasion value of about 161. It will be appreciated, however, that embodiments of the present invention are not limited to the heretofore-provided compounds as there are numerous additional or substitute components that may also be added to the compounds, including, for example, activators, retarders and additional accelerators, rubber processing oils, resins including tackifying resins, plasticizers, zinc oxide, antiozonants, peptizing agents, and curatives, to attain the properties as set forth above. Furthermore, one or both of the compounds may be changed depending on the specific race track and the conditions anticipated at the track the day of the race.

According to one embodiment, the mixing of all of the components of the compounds for one individual annular circumferential portion 30, 32, and 34 can be accomplished by methods known to those having ordinary skill in the art. For example, the ingredients can be mixed in at least two non-productive stages followed by a productive mix stage. The final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the runner mixing art. The circumferential portions 30, 32, and/or 34 may be provided individually as sheets that are individually formed, e.g., by extrusion casting.

Furthermore, the racing tire 10 can be built on a tire forming drum (not shown), vulcanization temperature can be from about 130° C. to about 170° C. Cure time may vary from about ten minutes to sixty minutes. Cure time and temperature depend on many variables well known in the art, including the composition of the tire components, including the cure systems in each of the layers, the overall tire size and thickness, etc. Vulcanization of the assembled tire results in complete or substantially complete vulcanization or crosslinking of all elements or layers of the tire assembly, e.g. the tread 18, the carcass 16, and the sidewalls 12. In addition to developing the desired characteristics of each compound and the overall structure, vulcanization enhances adhesion between these elements, resulting in a cured, unitary racing tire 10 from what were separate, multiple layers.

The racing tire 10, particularly the tread 18 of FIGS. 1-3, may be made with strip laminators, by dual extrusion, or by calendaring and applying laminations. By way of example and with reference to FIG. 2, the gradient between the first circumferential portion 30 and the second circumferential portion 32 may be made by adding the first and the second compounds into a strip laminator. The compounds may further be varied as the compounds are fed into a laminator to prepare the tread 18 shown in FIG. 2. Exemplary methods and equipment capable of preparing the tread 18 as shown in FIGS. 1-3 are described in commonly owned U.S. Pat. No. 7,780,809, filed on Jul. 31, 2006; U.S. Pat. No. 7,481,638, filed on Oct. 31, 2007; and U.S. Pat. No. 7,040,870, filed on Dec. 30, 2003, the disclosures of which are each incorporated by reference herein in its entirety.

While the present invention has been illustrated by the description of one or more embodiments thereof, and while the embodiments have been described in considerable detail, they are not intended to restrict or in any way limit the scope of the appended claims to such detail. Additional advantage and modifications will readily appear to those skilled in the art. The invention in its broader aspects is therefore not limited to the specific details, representative methods and illustrative examples shown and described. Accordingly, departures may be made from such details without departing from the scope or spirit of Applicants' general inventive concept.

What is claimed is:

1. A racing tire for use on a race car comprising:
a tread having a new tread thickness of no greater than about 0.125 inch, a tread width of greater than 11 inches, and defining a-running surface having a generally large radius of curvature when viewed along a tread width and that is adapted to be ground contacting during tire use, the tread including a first circumferential portion of a first rubber compound and a second circumferential portion of a second rubber compound, the first circumferential portion being situated adjacent the second circumferential portion and one shoulder of opposing first and second shoulders of the tire, the second circumferential portion forming at least a central portion of the running surface of the tire and being greater in width than the first circumferential portion, wherein the first rubber compound has a greater stiffness than the second rubber compound so as to provide the tread with greater wear resistance along the first circumferential portion, and the second rubber compound has a higher tan delta at 100° C. and/or a higher J" traction value than the first rubber compound so as to provide the tread with a greater traction along the second circumferential portion, wherein the second rubber compound includes a tan delta from 0.150 to 0.250 at 100° C. and a J" traction value from about 0.16 to 0.40, wherein the second rubber compound has a greater DIN abrasion value than the first rubber compound, which includes a DIN abrasion value from about 100 to about 140, wherein the first and second circumferential portions define the tread width and are adapted to be ground contacting simultaneously when the entire central portion of the running surface of the tire contacts the ground during tire use, and wherein the tread is free of a tread pattern thereby defining a racing slick.

2. The racing tire of claim 1 wherein the second circumferential portion is situated adjacent the other shoulder of the tire.

3. The racing tire of claim 1 further including at least a third circumferential portion having a third rubber compound.

4. The racing tire of claim 1 wherein the running surface is defined by a gradient in wear properties and/or traction properties from the first rubber compound to the second rubber compound.

5. The racing tire of claim 1 wherein the first and second circumferential portions define the tread width.

\* \* \* \* \*